United States Patent [19]
Clay

[11] 3,774,296
[45] Nov. 27, 1973

[54] METHOD OF MANUFACTURING A PRESSURE VESSEL ASSEMBLY

[75] Inventor: Eugene J. Clay, Houston, Tex.
[73] Assignee: Hahn & Clay, Houston, Tex.
[22] Filed: Sept. 29, 1972
[21] Appl. No.: 293,674

[52] U.S. Cl.............. 29/471.3, 29/482, 29/483, 113/120 S, 285/286
[51] Int. Cl............................................. B23k 31/02
[58] Field of Search ............... 113/120 S; 29/471.1, 29/471.3, 482, 483; 285/286; 220/3

[56] References Cited
UNITED STATES PATENTS

| | | | |
|---|---|---|---|
| 2,050,326 | 8/1936 | Hopkins | 113/120 S |
| R22,251 | 1/1943 | Stresau | 220/3 |
| 2,359,446 | 10/1944 | Scudder | 29/471.1 X |
| 2,365,696 | 12/1944 | Gruff | 29/471.1 |
| 2,365,697 | 12/1944 | Gruff | 220/3 |
| 2,372,723 | 4/1945 | Jasper | 29/471.1 X |
| 3,105,808 | 10/1963 | Lawson et al | 29/471.1 X |
| 3,306,642 | 2/1967 | Arnold et al | 29/471.1 X |

Primary Examiner—Richard B. Lazarus
Attorney—Pravel, Wilson & Matthews

[57] ABSTRACT

A pressure vessel assembly and method of assembly, wherein fabricated pressure vessel sections are joined together, usually in the field, or at some point remote from the point of fabrication of the sections, by welding a plurality of prestressed inserts to the adjacent sections, with the inserts being of gradually increasing widths from the inner layers outwardly and with the welds for each insert being for only a single layer to obtain maximum weld strength.

7 Claims, 2 Drawing Figures

Patented Nov. 27, 1973 3,774,296

METHOD OF MANUFACTURING A PRESSURE VESSEL ASSEMBLY

BACKGROUND OF THE INVENTION

The field of this invention is pressure vessels and methods of fabricating same.

It has been customary to join sections of multi-layer pressure vessels together using an annular V-shaped weld groove. Because the thickness of the walls of such vessels may be ten inches or more, the welding in such deep grooves is difficult, particularly in the field where such factors as accessibility to the weld groove and temperature control at the weld are problems. Further, it sometimes develops that such welding cannot all be performed in the shop because the size of the finished pressure vessel would be too large for handling and/or transportation to the site of ultimate use.

The foregoing problem was recognized in U.S. Pat. No. 3,306,642, and it was proposed to solve the problem by using filler strips of equal width throughout the thickness of the wall of the vessel. Such procedure and the resulting product suffers from several disadvantages, which include the difficulty of welding in the depth of the weld groove, and the build-up of the welds on each other so that each annular weld is for the full wall thickness of the vessel.

Staggered welds have been proposed with solid filler rings as in U. S. Pat. Nos. 2,365,696 and 2,365,697, which are added during the course of manufacture prior to the addition of the vessel layers adjacent thereto, and as such is not suitable for field assembly. The use of an internal insert as disclosed in U. S. Pat. No. 3,105,808 is likewise of no avail in field assembly.

SUMMARY OF THE INVENTION

The present invention relates to a pressure vessel assembly and method of assembly which makes possible satisfactory welding in the field of multi-layer pressure vessel sections. Adjacent vessel sections are made or prepared with their annular ends formed so as to receive a plurality of arcuate inserts, two or more for each layer of the adjacent sections, and each of which is pre-stressed to correspond with the prestress in the layers of the vessel sections. The weld for each insert is only for the thickness of the layer being welded, and the width of the inserts increase as they go radially outwardly so as to provide easy access to the weld grooves for welding and to offset the annular welds for each insert from the welds for those inserts above and below each insert.

DESCRIPTION OF THE PREFERRED EMBODIMENT

Figure 1:
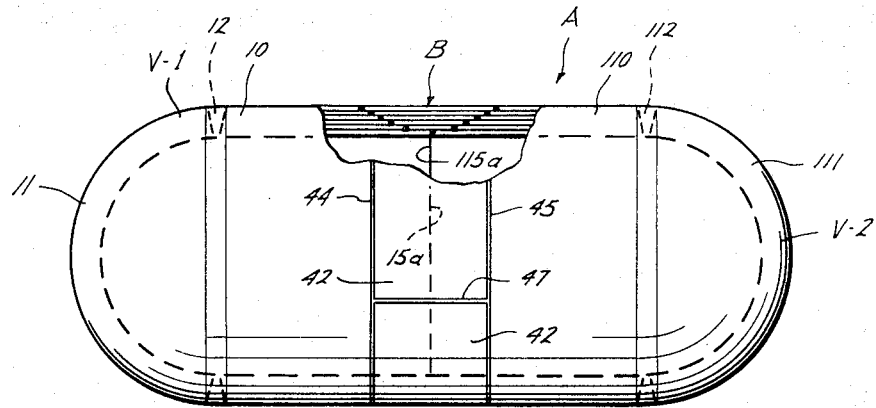
FIG. 1 is an elevation, partly in section, illustrating the pressure vessel assembly of this invention.

In the drawings, the letter A designates generally the pressure vessel assembly of this invention which may be a complete pressure vessel formed from two multi-layer pressure vessel sections V-1 and V-2. The multi-layer construction of the vessel sections V-1 and V-2 may be in accordance with that described in U.S. Reissue Pat. No. Re. 22,251 or any other similar procedure for imparting the prestressed condition to the vessel sections V-1 and V-2. Briefly, in accordance with the method of this invention, the vessel sections V-1 and V-2 are fabricated in the conventional manner, but their ends are specially prepared or fabricated so as to permit the subsequent connection of the sections V-1 and V-2 by the use of a plurality of arcuate inserts, generally designated with the letter B in the drawings. By reason of the method of this invention, it is possible to fabricate extremely large pressure vessels which would normally be too large for transportation over the highways and railroads because the vessel may be fabricated in the sections V-1 and V-2 or any other group of sections, then shipped in sections which are of a size suitable for shipping, and finally the vessel sections are assembled and welded together with the inserts B, as will be explained, in the field or at the point of installation.

Considering the invention more in detail, the pressure vessel section V-1 is formed with the usual cylindrical portion 10 and the usual head portion 11 which is welded thereto by a conventional annular weld 12. The pressure vessel section V-2 is similarly formed with a cylindrical shell section 110, a hemispherical head 111, and an annular weld 112. Although the invention is thus described with the vessel section V-1 and V-2 forming a complete vessel when assembled with the inserts B welded thereto, it should be understood that the assembly A of this invention may include the joining of cylindrical sections such as 10 and 110 which do not have the heads 11 and 111 therewith.

Figure 2:
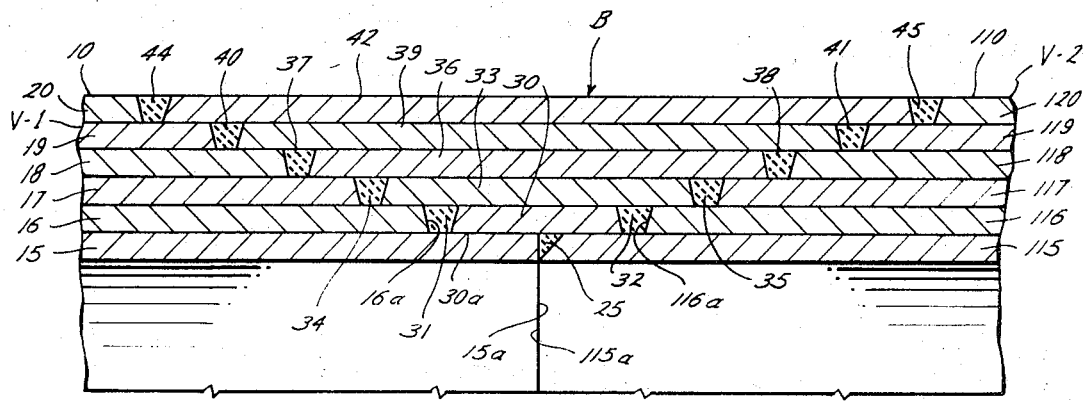
FIG. 2 is an enlarged partial view illustrating in further detail the portion of FIG. 1 which is in sections.

In FIG. 2, the sectional portions of the vessel sections V-1 and V-2 are illustrated with a plurality of annular layers 15, 16, 17, 18, 19, and 20, the number which is merely illustrative of a multilayer vessel having a large number of annular layers forming the shell or cylinder 10. Similarly, the shell or cylinder 110 has layers 115, 116, 117, 118, 119, and 120 which are mrerely representative of the multilayers of that cylinder or shell 110.

The innermost or inner layers 15 and 115 of the adjacent vessel sections V-1 and V-2 are positioned so that their annular ends 15a and 115a are in abuttment, or substantially in abuttment, and then an annular weld 25 is made to weld together the inner layers 15 and 115.

It is to be noted that the weld 25 is made before any of the inserts B are disposed in position. Thus, the layers 16 and 116 have their ends 16a and 116a spaced longitudinally from each other to provide a longitudinal space therebetween into which two or more arcuate inserts 30 are disposed. The arcuate inserts 30 are positioned in the annular space between the ends 16a and 116a after the weld 25 has been completed. When there are two of the arcuate inserts 30, they are each substantially semicylindrical so that the two together form a complete cylinder with gaps at their ends for longitudinal welds. Also there is a sufficient gap at their ends so that the two inserts 30 may be compressed tightly and put under a prestress with the inner surface 30a of each insert 30 firmly in contact with the external surfaces of the layers 15 and 115. Such procedure is well known and is accomplished using bands or other external means for applying a radially compressive force to the arcuate inserts 30 prior to the welding thereof. While the arcuate inserts 30 are thus under compression with their inner surfaces 30a in contact with the external surfaces of the layers 15 and 115, annular welds 31 and 32 are made at each edge of the arcuate inserts 30 and with the ends 16a and 116a to thus unite and weld together the layers 16 and 116a. In the preferred form of the invention, the amount of prestress in the arcuate inserts 30 is substantially the same as the amount of prestress in the layers 16 and 116.

Two or more arcuate inserts 33 are prestressed, welded together longitudinally and also welded together by the annular welds 34 and 35 so as to also join such inserts 33 to the layers 17 and 117. Similarly, two or more inserts 36 are prestressed, longitudinally welded and also welded at annular welds 37 and 38 to the layers 18 and 118. Two or more inserts 39 are prestressed, longitudinally welded, and also annularly welded at welds 40 and 41 to layers 19 and 119. The outermost inserts 42 are prestressed, longitudinally welded and then annularly welded at annular welds 44 and 45 to the outer layers 10 and 110. Thus it can be seen that the inserts 30, 33, 36, 39, and 42 are sequentially or successively positioned in the annular spaces between the ends of the layers on the adjacent vessels V-1 and V-2, and each is prestressed and welded into position to fill such annular spaces. One of the longitudinal welds 47 can be seen in FIG. 1 which serves to join together the adjacent ends of the outer arcuate inserts 42. It will be appreciated that a similar longitudinal weld is on the opposite side of the assembly A and is not visible in FIG. 1 so as to complete the annular configuration of the two inserts 42.

As previously explained, there may be more than two of such arcuate inserts 42, in which case there will be a longitudinal weld between the adjacent ends of each of the inserts 42.

In the preferred form of the invention the amount of prestress in each of the inserts is equal to, or substantially equal to, the amount of prestress in the layers to which the inserts are joined. It is also to be noted that the welds are only one layer in thickness and they are offset longitudinally with respect to each other so that they are progressively further apart from the inner layer outwardly. This provides access to the areas for welding as each of the inserts is applied and it provides for stronger welds than when the welds are accumulated in a full depth throughout the multiple layers of the vessel wall.

Although the invention herein has been described for multilayer vessel sections, it will be understood that the vessel sections could be solid wall sections with the inner ends stair-stepped to correspond with the ends of the layers as shown in the drawings so as to accommodate the inserts of increasing width from the inner layer outwardly, whereby the invention may be utilized for joining solid wall vessel sections in the field as well as multilayer vessel sections. However, such use of the invention would not produce the advantage of prestressing the inserts in conjunction with the prestressing of the vessel sections. It should also be understood that although the invention is particularly described using only two arcuate inserts for each diameter or ring, it will be appreciated that more than two arcuate inserts may be utilized for each ring between each pair of the layers on the opposite vessel sections. Also, although the invention is particularly suitable for field assembly, it should be understood that the invention is not limited thereto.

The foregoing disclosure and description of the invention are illustrative and explanatory thereof, and various changes in the size, shape, and materials as well as in the details of the illustrated construction may be made without departing from the spirit of the invention.

I claim:

1. A method of assembling adjacent pressure vessel sections, comprising the steps of:
   fabricating two cylindrical multi-layer pressure vessel sections, each with an end in which the ends of the layers are successively shorter from the inner layer radially outwardly;
   disposing said ends adjacent to each other so as to substantially abut the ends of the inner layers and to provide annular spaces between the ends of each layer of the two sections, which spaces are successively larger from the inner layer radially outwardly;
   welding the end of the inner layers of said sections to each other; and
   successively positioning and welding at least two arcuate inserts in each of the annular spaces between the layers of the sections.

2. The method set forth in claim 1, including the steps of:
   applying a prestress pressure to the arcuate inserts in each layer prior to welding same to said ends of said sections.

3. The method set forth in claim 1, including:
   prestressing the layers of each of said pressure vessel sections during fabrication thereof and prior to disposing same adjacent to each other for joining the layers thereof together.

4. The method set forth in claim 1, including:
   prestressing the layers of each of said pressure vessel sections during fabrication thereof and prior to disposing same adjacent to each other for joining the layers thereof together; and
   applying a prestress pressure to the arcuate inserts in each layer prior to welding same to said ends of said sections.

5. The method set forth in claim 1, wherein:
   said welding for said inserts extends annularly at the sides of the inserts for each of the layers of the vessel sections.

6. The method set forth in claim 1, wherein:
   said welding for said inserts extends annularly at the sides of the inserts for each of the layers of the vessel sections; and
   each weld is only as thick as each layer of each of said sections.

7. The method set forth in claim 6, wherein:
   each of said welds at the different layers of said sections is longitudinally offset from the welds in the other layers of said sections.

* * * * *